United States Patent
Fujisawa et al.

(10) Patent No.: US 7,244,192 B2
(45) Date of Patent: Jul. 17, 2007

(54) RUBBER COMPOSITION FOR GOLF BALL

(75) Inventors: Koichi Fujisawa, Kobe (JP); Kazuhisa Fushihara, Kobe (JP)

(73) Assignee: SRI Sports Limited, Kobe-Shi (JP)

( * ) Notice: Subject to any disclaimer, the term of this patent is extended or adjusted under 35 U.S.C. 154(b) by 48 days.

(21) Appl. No.: 10/716,627

(22) Filed: Nov. 20, 2003

(65) Prior Publication Data
US 2004/0110906 A1 Jun. 10, 2004

(30) Foreign Application Priority Data
Nov. 21, 2002 (JP) ............... 2002-337635

(51) Int. Cl.
*A63B 37/00* (2006.01)
(52) U.S. Cl. .................. 473/351; 473/367; 473/377; 524/114; 524/318; 524/394
(58) Field of Classification Search ............... 473/351, 473/367, 377; 524/114, 318, 394
See application file for complete search history.

(56) References Cited

U.S. PATENT DOCUMENTS

| | | | |
|---|---|---|---|
| 4,650,193 A * | 3/1987 | Molitor et al. | 473/373 |
| 4,683,257 A | 7/1987 | Kakiuchi et al. | 524/432 |
| 4,929,678 A | 5/1990 | Hamada et al. | 525/193 |
| 4,955,613 A | 9/1990 | Gendreau et al. | 273/218 |
| 6,315,684 B1 * | 11/2001 | Binette et al. | 473/377 |
| 6,966,850 B2 * | 11/2005 | Watanabe et al. | 473/377 |

FOREIGN PATENT DOCUMENTS

| | | | |
|---|---|---|---|
| JP | 6-80123 B2 | 10/1994 |
| JP | 2644226 B2 | 5/1997 |
| JP | 2678240 B2 | 8/1997 |
| JP | 11-319148 A | 11/1999 |
| JP | 2001-149502 A | 6/2001 |
| JP | 2001-149503 A | 6/2001 |
| JP | 2001-149505 A | 6/2001 |
| JP | 2001-149506 A | 6/2001 |
| JP | 2001-149507 A | 6/2001 |
| JP | 2001-149508 A | 6/2001 |

* cited by examiner

*Primary Examiner*—Peter D. Mulcahy
(74) *Attorney, Agent, or Firm*—Birch, Stewart, Kolasch & Birch, LLP

(57) ABSTRACT

The present invention provides a rubber composition for obtaining golf ball having good processability, excellent rebound characteristics and excellent durability. The present invention relates to a rubber composition for golf ball comprising a base rubber, a co-crosslinking agent, an organic peroxide, a filler and a processing aid, wherein the base rubber comprises a polybutadiene (a) containing a cis-1,4 bond of not less than 80% and synthesized using lanthanide-containing catalyst, the organic peroxide comprises an organic peroxide having 10 hours half-life period temperature of 80 to 100° C., and the processing aid is fatty acid ester, fatty acid salt or the mixture thereof.

5 Claims, No Drawings

US 7,244,192 B2

RUBBER COMPOSITION FOR GOLF BALL

This nonprovisional application claims priority under 35 U.S.C. § 119(a) on Patent Application No. 2002-337635 filed in JAPAN on Nov. 21, 2002, the entire contents of which are hereby incorporated by reference.

FIELD OF THE INVENTION

The present invention relates to a rubber composition for golf ball. More particularly, it relates to a rubber composition for obtaining golf ball having good processability, excellent rebound characteristics and excellent durability.

BACKGROUND OF THE INVENTION

Hitherto, a rubber composition comprising a polybutadiene having high cis-1,4 bond content, narrow molecular weight distribution and high Mooney viscosity, synthesized using nickel-containing catalyst, has been suitably used as a rubber composition for a one-piece solid golf ball, a solid core of a solid golf ball, or a solid center of a thread wound golf ball, in order to impart rebound characteristics and durability thereto. Recently, a polybutadiene having particularly narrow molecular weight distribution, synthesized using lanthanide-containing catalyst, has been used for the same application (in Japanese Patent Kokoku Publication No. 80123/1994, Japanese Patent Nos. 2644226 and 2678240, Japanese Patent Kokai Publication No. 319148/1999 and the like).

It is disclosed, for example, in Japanese Patent Kokoku Publication No. 80123/1994 that a mixture consisting of (i) a polybutadiene containing a cis-1,4 bond of not less than 40%, having a Mooney viscosity of 70 to 100 $ML_{1+4}$ (100° C.), synthesized using nickel-containing catalyst and/or cobalt-containing catalyst, and (ii) a polybutadiene containing a cis-1,4 bond of not less than 40%, having a Mooney viscosity of 30 to 90 $ML_{1+4}$ (100° C.), synthesized using a catalyst consisting of lanthanide rare earth elements-containing compound, or a polybutadiene containing a cis-1,4 bond of not less than 40%, having a Mooney viscosity of 20 to 50 $ML_{1+4}$ (100° C.), synthesized using nickel-containing catalyst and/or cobalt-containing catalyst can be suitably used as a rubber composition for golf balls. When the polybutadiene (i) is used for the rubber composition, rebound characteristics of the resulting golf ball are improved. However, when the polybutadiene (ii) having high Mooney viscosity is used in combination with the polybutadiene (i), workability when producing is degraded.

It is disclosed in Japanese Patent No. 2644226 that a polybutadiene containing a cis-1,4 bond of not less than 80% and having a Mooney viscosity of 45 to 90 $ML_{1+4}$ (100° C.) and a ratio (Mw/Mn) of weight average molecular weight (Mw) to number average molecular weight (Mn) of 4.0 to 8.0 can be suitably used for golf balls. Although the use of the polybutadiene imparts sufficient physical properties to golf balls, improvement on rebound characteristics and durability is further required.

It is disclosed in Japanese Patent No. 2678240 that a mixture of 85 to 15 phr of a nickel or cobalt-catalyzed polybutadiene having a cis-1,4 content of more than 40% and a Mooney viscosity of less than 50, and 15 to 85 phr of a lanthanide-catalyzed polybutadiene having a cis-1,4 content of more than 40% and a Mooney viscosity of less than 50 can be suitably used for a golf ball. However, when the mixture of the nickel- or cobalt-catalyzed polybutadiene having low Mooney viscosity (less than 50) and the lanthanide-catalyzed polybutadiene having low Mooney viscosity (less than 50), rebound characteristics and durability of the resulting golf ball are not sufficiently obtained.

In Japanese Patent Kokai Publication No. 319148/1999, a solid golf ball comprising a core and a cover covering the core, of which the core comprises at least one rubber layer formed from a rubber composition comprising a polybutadiene mixture, unsaturated carboxylic acid or a metal salt of unsaturated carboxylic acid, organic peroxide and inorganic filler, is disclosed. The polybutadiene mixture consists of (a) a polybutadiene containing a cis-1,4 bond of not less than 80 molar %, having a Mooney viscosity of 50 to 69 $ML_{1+4}$ (100° C.) and a ratio (Mw/Mn) of weight average molecular weight (Mw) to number average molecular weight (Mn) of 4.0 to 8.0, synthesized using nickel-containing catalyst and/or cobalt-containing catalyst, and (b) a polybutadiene containing a cis-1,4 bond of not less than 40%, having a Mooney viscosity of 20 to 90 $ML_{1+4}$ (100° C.), synthesized using lanthanide-containing catalyst, and a weight ratio (a)/(b) is 30/70 to 90/10. However, workability when producing and rebound characteristics of the resulting golf ball are not sufficiently obtained. Therefore, it is required to further improve the performances of the golf ball.

In Japanese Patent Kokai Publication Nos. 149502/2001, 149503/2001, 149505/2001, 149506/2001, 149507/2001 and 149508/2001, a golf ball comprising as a constituent element a vulcanized molded article of the rubber composition comprising polybutadiene synthesized using a rare earth element-containing catalyst is disclosed. The polybutadiene is obtained by adjusting 5 mass % toluene solution viscosity, a ratio (Mw/Mn) of weight average molecular weight (Mw) to number average molecular weight (Mn), Mooney viscosity and the like to specified ranges.

However, polybutadiene having high molecular weight and high Mooney viscosity generally has poor workability when producing and poor processability. Since particularly polybutadiene synthesized using lanthanide-containing catalyst has also narrow molecular weight distribution, the flow properties are poor, and it is difficult to process it. In addition, since the processability is poor, release agent or air is remained on the surface of or in the molded article after molding, which degrades the durability. If made by a conventional method, particularly by using a conventional vulcanization condition and molding condition, it is difficult to obtain a core or golf ball having hardness distribution such that the outer portion is hard and the inner portion is soft.

OBJECTS OF THE INVENTION

A main object of the present invention is to provide a rubber composition for obtaining golf ball having good processability, excellent rebound characteristics and excellent durability.

According to the present invention, the object described above has been accomplished by using polybutadiene synthesized using lanthanide-containing catalyst as a base rubber, organic peroxide having a specified 10 hours half-life period temperature and specified processing aid, thereby providing a rubber composition for obtaining golf ball having good processability, excellent rebound characteristics and excellent durability.

SUMMARY OF THE INVENTION

The present invention provides a rubber composition for golf ball comprising a base rubber, a co-crosslinking agent, an organic peroxide, a filler and a processing aid, wherein the base rubber comprises-a polybutadiene (a) containing a
cis-1,4 bond of not less than 80% and synthesized using lanthanide-containing catalyst,
the organic peroxide has 10 hours half-life period temperature of 80 to 100° C., and
the processing aid is fatty acid ester, fatty acid salt or the mixture thereof.

In order to put the present invention into a more suitable practical application, it is preferable that:
the polybutadiene (a) have a Mooney viscosity of not less than 50 to less than 65 $ML_{1+4}$ (100° C.), a ratio (Mw/Mn) of weight average molecular weight (Mw) to number average molecular weight (Mn) of 2.0 to 6.0;
the organic peroxide be 1,1-bis (t-butylperoxy)-3,3,5-trimethylcyclohexane; and
the processing aid be contained in an amount of 0.1 to 10 parts by weight, based on 100 parts by weight of the base rubber.

In another embodiment, the present invention relates a solid golf ball comprising at least one layer of a vulcanized molded article of the rubber composition for golf ball comprising a base rubber, a co-crosslinking agent, an organic peroxide, a filler and a processing aid, wherein
the base rubber comprises a polybutadiene (a) containing a cis-1,4 bond of not less than 80% and synthesized using lanthanide-containing catalyst,
the organic peroxide has 10 hours half-life period temperature of 80 to 100° C.,
the processing aid is fatty acid ester, fatty acid salt or the mixture thereof, and
the vulcanization of the vulcanized molded article is conducted by press molding at 100 to 130° C.

In the rubber composition for golf ball of the present invention,
(i) high rebound characteristics are accomplished by using polybutadiene synthesized using lanthanide-containing catalyst as a base rubber,
(ii) the processability degraded by the polybutadiene synthesized using lanthanide-containing catalyst is improved by using a specified processing aid,
(iii) since it is difficult to obtain a core or golf ball having hardness distribution such that the outer portion is hard and the inner portion is soft in case of using the polybutadiene synthesized using lanthanide-containing catalyst and making at a conventional vulcanization condition (high temperature vulcanization, 150 to 170° C.), the core or golf ball is made at low temperature vulcanization condition (100 to 130° C.), and
(iv) the same vulcanization degree is obtained at the low temperature vulcanization condition for about the same vulcanizing time as the high temperature vulcanization and a core or golf ball having hardness distribution such that the outer portion is hard and the inner portion is soft is obtained by using the organic peroxide (10 hours half-life period temperature of 80 to 100° C.) decomposable at the lower temperature than the temperature that the conventional organic peroxide is decomposed.

DETAILED DESCRIPTION OF THE INVENTION

The rubber composition for golf ball of the present invention is vulcanized by press-molding under applied heat to obtain a one-piece solid golf ball as described above. The rubber composition of the present invention may be used for forming at least one portion of the core of a two-piece solid golf ball or a multi-piece solid golf ball, such as a three-piece solid golf ball, which consists of a core of rubber material and a cover of thermoplastic resin covering on the core. In order to explain the rubber composition for golf ball of the present invention simply, a core of two-piece solid golf ball will be mainly used hereinafter for explanation. However, the rubber composition may be applied to the one-piece golf ball and the core of the multi-piece solid golf ball other than the two-piece solid golf ball.

The solid golf ball of the present invention is formed by vulcanizing and press-molding the rubber composition described above to obtain a core, followed by covering the core with a cover. The core used for the solid golf ball of the present invention is obtained by vulcanizing and press-molding the rubber composition. The rubber composition comprises a base rubber, a co-crosslinking agent, an organic peroxide, an inorganic filler, a processing aid and optionally antioxidant, and the like.

In the rubber composition for golf ball of the present invention, it is required for the base rubber to comprise a polybutadiene (a) having a cis-1,4 bond content of not less than 80%, preferably not less than 90% and synthesized using lanthanide-containing catalyst. When the cis-1,4 bond content is smaller than 80%, the rebound characteristics of the resulting golf ball are not sufficiently obtained. It is desired for the polybutadiene to have a Mooney viscosity of not less than 50 to less than 65 $ML_{1+4}$ (100° C.), preferably 50 to 62 $ML_{1+4}$ (100° C.), more preferably 50 to 60 $ML_{1+4}$ (100° C.), most preferably 52 to 60 $ML_{1+4}$ (100° C.). When the Mooney viscosity is lower than 50 $ML_{1+4}$ (100° C.), the workability when producing is good, but the rebound characteristics are poor. On the other hand, when the Mooney viscosity is not less than 65 $ML_{1+4}$ (100° C.), the rebound characteristics are good, but the workability when producing is poor.

It is desired for the polybutadiene to have a ratio (Mw/Mn) of weight average molecular weight (Mw) to number average molecular weight (Mn) of 2.0 to 6.0, preferably 2.0 to 4.0, more preferably 2.5 to 3.5. When the ratio (Mw/Mn) is smaller than 2.0, the rebound characteristics are good, but the workability when producing is poor. On the other hand, when the ratio (Mw/Mn) is larger than 6.0, the processability is good, but the rebound characteristics are poor. It is desired for the polybutadiene to have a weight average molecular weight (Mw) of $50\times10^4$ to $70\times10^4$, preferably $54\times10^4$ to $68\times10^4$, more preferably $56\times10^4$ to $67\times10^4$. When the Mw is lower than $50\times10^4$, the rebound characteristics are-not sufficiently obtained. On the other hand, when the Mw is higher than $70\times10^4$, the rebound characteristics are good, but the workability when producing is poor. It is desired for the polybutadiene to have a weight average molecular weight (Mn) of $15\times10^4$ to $40\times10^4$, preferably $18\times10^4$ to $35\times10^4$, more preferably $20\times10^4$ to $32\times10^4$. When the Mn is lower than $15\times10^4$, the rebound characteristics are not sufficiently obtained. On the other hand, when the Mn is higher than $40\times10^4$, the rebound characteristics are good, but the workability when producing is poor.

In the rubber composition for golf ball of the present invention, it is desired for the amount of the polybutadiene to be within the range of 10 to 100 parts by weight, preferably 50 to 100 parts by weight, more preferably 70 to 100 parts by weight, based on 100 parts by weight of the base rubber. When the amount is smaller than 10 parts by weight, the technical effects accomplished by the presence of the polybutadiene are not sufficiently obtained, and the rebound characteristics are not sufficiently improved.

In the rubber composition for golf ball of the present invention, the amount of the polybutadiene varies depending on a position in the golf ball where it is used, such as one-piece solid golf ball, at least one portion of the core of a two-piece solid golf ball or a multi-piece solid golf ball, such as a three-piece solid golf ball. Therefore, the base rubber may be formed from the polybutadiene alone, but the polybutadiene may be compounded in combination with synthesis rubber, particularly the other polybutadiene rubber other than the polybutadiene described above, which has been conventionally used for solid golf balls. The base rubber may optionally contain natural rubber, polyisoprene rubber, styrene-butadiene rubber, ethylene-propylene-diene rubber (EPDM) and the like.

The term "Mooney viscosity" as used herein refers to an indication of a viscosity which is measured using a Mooney viscometer as a kind of rotational plastometer. The Mooney viscosity is typically used for measuring a viscosity of a rubber composition in the field of rubber industry. The Mooney viscosity is determined by closely putting a rubber composition in a gap between a cylindrical dice and a rotor positioned at the center of the dice, and then measuring a torque occurring when rotating a rotor at a testing temperature of 100° C., for a preheating time of 1 minute, at the number of revolutions of 2 rpm, for the time of revolution of 4 minutes. The Mooney viscosity is expressed in $ML_{1+4}$ (100° C.), wherein M represents a Mooney viscosity, L represents a large rotor (L type) as a shape of the rotor, (1+4) represents that a preheating time is 1 minute and a time of revolution of the rotor is 4 minutes, and 100° C. represents a testing temperature. The measurement is generally conducted according to JIS K 6300.

Lanthanide-containing catalysts used to synthesize the polybutadienes (a) in the present invention are, for example, a combination of a lanthanide compound, an organoaluminum compound, a Lewis base and optionally a Lewis acid. Examples of the lanthanide compounds include halides, carboxylates, alcoholates, thioalcoholates and amides of rare earth metals having atomic numbers of 57 to 71, with neodymium being the preferred rare earth metal. Examples of the organoaluminum compounds include those having the general formula:

Al $R_1R_2R_3$ wherein $R_1$, $R_2$ and $R_3$, which may be the same or different, are independently selected from hydrogen or hydrocarbon group having 1 to 8 carbon atoms. The Lewis bases serve to convert the lanthanide compounds into complexes. Acetylacetone, ketone, alcohols and the like may be used for this purpose. Examples of the Lewis acids include aluminum halides of the general formula:

Al $X_nR_{3-n}$ wherein X is a halogen, R is alkyl, aryl or aralkyl group having 1 to 20 carbon atoms, and n is 1, 1.5, 2 or 3; or silicon tetrachloride, tin tetrachloride, titanium tetrachloride, and the like.

When butadiene is polymerized in the present of the lanthanide-containing catalyst, the molar ratio of butadiene to lanthanide compound is within the range of $5\times10^2$ to $5\times10^6$, preferably $1.0\times10^3$ to $1.0\times10^5$. The molar ratio of organoaluminum compound to lanthanide compound is within the range of 5 to 500, preferably 10 to 300. The molar ratio of Lewis base to lanthanide compound is within the range of at least 0.5, preferably 1 to 20. When Lewis acid is used, the molar ratio of halide in the Lewis acid to lanthanide compound is within the range of 1 to 10, preferably 1.5 to 5. In the polymerization of butadiene, the lanthanide-containing catalysts may be used as solution in an organic solvent such as n-hexane, cyclohexane, n-heptane, toluene, xylene, benzene and the like, or carried on suitable carriers such as silica, magnesia and magnesium chloride. The polymerization of butadiene may be carried out in a solvent, or bulk polymerization without a solvent may also be employed. The polymerization temperature is in the range of −30 to 150° C., and the polymerization pressure may vary depending on other conditions.

In the rubber composition for golf ball of the present invention, metal salt of α, β-unsaturated carboxylic acid is used as the co-crosslinking agent. Examples of the α, β-unsaturated-unsaturated carboxylic acid include α, β-unsaturated-unsaturated carboxylic acids having 3 to 8 carbon atoms, such as acrylic acid, methacrylic acid, cinnamic acid, crotonic acid, itaconic acid, fumaric acid and the like. Preferred are acrylic acid and methacrylic acid. Examples of the metal salts include sodium, potassium, lithium, magnesium, calcium, zinc, barium, aluminum, tin, zirconium, cadmium salts, and the like. Preferred are a sodium salt, zinc salt and magnesium salt. The amount of the co-crosslinking agent is from 20 to 50 parts by weight, preferably from 25 to 40 parts by weight, more preferably from 28 to 35 parts by weight, based on 100 parts by weight of the base rubber. When the amount of the co-crosslinking agent is smaller than 20 parts by weight, a desired hardness of the core is sufficiently obtained. On the other hand, when the amount of the co-crosslinking agent is larger than 50 parts by weight, the core is too hard, and the shot feel of the resulting golf ball is poor. The metal salt of α, β-unsaturated carboxylic acid may be compounded as a combination of the α, β-unsaturated carboxylic acid and a metal oxide such as zinc oxide, which are separately compounded and react with each other during mixing the rubber composition to form a metal salt of α, β-unsaturated carboxylic acid.

In the rubber composition for golf ball of the present invention, it is required for the organic peroxide, which acts as crosslinking agent or curing agent, to have 10 hours half-life period temperature of 80 to 100° C., preferably 83 to 98° C., more preferably 85 to 95° C. Examples of the organic peroxides include for example 1,1-bis(t-butyl peroxy)cyclohexane, 1,1-bis(t-hexyl peroxy)cyclohexane, 1,1-bis(t-butyl peroxy)-2-methylcyclohexane, 1,1-bis(t-hexyl peroxy)-3,3,5-trimethylcyclohexane, 1,1-bis(t-butyl peroxy)-3,3,5-trimethylcyclohexane, 2,2-bis(4,4-di-butyl peroxy cyclohexyl)propane, 2,5-dimethyl-2,5-di(m-toluoyl peroxy)hexane, 2,5-dimethyl-2,5-di(benzoyl peroxy)hexane, t-butyl peroxy maleic acid, t-butyl peroxy-3,3,5-trimethyl hexanoate, t-butyl peroxy laurate, t-hexyl peroxy benzoate, t-butyl peroxy isopropyl monocarbonate, t-hexyl peroxy isopropyl monocarbonate, t-butyl peroxy-2-ethylhexyl monocarbonate and the like. The amount of the organic peroxide is from 0.5 to 5.0 parts by weight, preferably from 0.5 to 3.0 parts by weight, more preferably from 0.6 to 2.0 parts by weight, based on 100 parts by weight of the base rubber. When the amount of the organic peroxide is smaller than 0.5 parts by weight, crosslinking reaction does not sufficiently occur, and a desired hardness of the core is sufficiently obtained. On the other hand, when the amount of the organic peroxide is larger than 5.0 parts by weight, the hardness of the core is not heightened any further.

The organic peroxide, which is generally obtained by substituting one or two hydrogen atoms of hydrogen peroxide (H—O—O—H) with a substituent, is a compound having oxygen-oxygen (—O—O—) bond in molecular thereof. Since the organic peroxide has the (—O—O—) bond having relatively small bond strength, it is easily dissociated by heat, light and the like to form free radical. The free radical functions as a co-crosslinking agent for rubber as used in the present invention. A half-life period is used as an index representing a degree of the dissociation by heat. The half-life period is the time to dissociate the organic peroxide to reduce the amount of active oxygen by half of the original. The amount of the active oxygen, which is the content of the (—O—O—) bond contained in a unit quantity of the organic peroxide, represents the amount of the free radical obtained from a unit quantity of the organic peroxide. The theoretical content of active oxygen is represented by the following formula:

$$\text{Theoretical content of active oxygen (\%)} = \frac{(\text{Number of —O—O— bond in one molecular}) \times 16}{\text{Molecular weight}}$$

The wording "organic peroxide having 10 hours half-life period temperature of 80 to 100° C." as used herein refers to the organic peroxide that the temperature when the half-life period is 10 hours is within the range of 80 to 100° C.

When the half-life period temperature is higher than 100° C., it is late to initiate the dissociation of the organic peroxide, and the vulcanization rate of the rubber is too small. On the other hand, when the half-life period temperature is lower than 80° C., the vulcanization rate of the rubber is too large, and the storage stability of unvulcanized rubber composition is degraded. In the present invention, it is possible to obtain the vulcanized molded article having the same vulcanization degree as the conventional vulcanization condition at the vulcanization condition (100 to 130° C.) that the vulcanization temperature is lower than that of the conventional vulcanization condition (150 to 170° C.) by using the "organic peroxide having 10 hours half-life period temperature of 80 to 100° C.". Therefore, the resulting vulcanized molded article can have hardness distribution such that the outer portion is hard and the inner portion is soft.

As the organic peroxide used for the golf ball of the present invention, the above organic peroxide having 10 hours half-life period temperature of 80 to 100° C. may be used alone, but may be used in combination with organic peroxides other than the above organic peroxide. Examples of the organic peroxides include dicumyl peroxide, di-t-butyl peroxide, 2,5-dimethyl-2,5-di(t-butylperoxy)hexane, 2,2-bis(t-butylperoxy)butane, t-butyl peroxy benzoate, benzoyl peroxide, t-hexyl peroxy-2-ethylhexanoate, t-butyl peroxy-2-ethylhexanoate, t-butyl peroxy-2-ethylhexanoate, t-butyl peroxyisobutyrate, 2,5-dimethyl-2,5-di(2-ethylhexanoylperoxy)hexane and the like.

A weight ratio ($W_1/W_A$) of the amount of the organic peroxide having 10 hours half-life period temperature of 80 to 100° C. ($W_1$) to the total amount of the all peroxides ($W_A$) is within the range of 0.5 to 1.0, preferably 0.8 to 1.0. When the weight ratio is smaller than 0.5, the technical effects accomplished by the presence of the organic peroxide having 10 hours half-life period temperature of 80 to 100° C. are not sufficiently obtained, and the vulcanization degree is not sufficiently obtained at the low temperature vulcanization condition (100 to 130° C.).

When used in combination with the other organic peroxide, the total amount of the organic peroxides is within the range of 0.5 to 5.0 parts by weight, 0.5 to 3.0 parts by weight, more preferably 0.6 to 2.0 parts by weight, based on 100 parts by weight of the base rubber.

The inorganic filler includes, for example, zinc oxide, barium sulfate, calcium carbonate, silica and the like. The preferred inorganic filler is zinc oxide, which also acts as a vulcanization aid. The amount of the inorganic filler is from 3 to 40 parts by weight, preferably from 4 to 35 parts by weight, more preferably from 4 to 30 parts by weight, based on 100 parts by weight of the base rubber. When the amount of the inorganic filler is smaller than 3 parts by weight, crosslinking reaction does not sufficiently occur, and a desired hardness of the core is sufficiently obtained. On the other hand, when the amount of the filler is larger than 40 parts by weight, the rebound characteristics of the resulting golf ball are degraded.

The processing aid used in the present invention is used in order to improve the processability degraded by using the polybutadiene synthesized using lanthanide-containing catalyst. The wording "the processability is poor" as used herein means that the surface appearance of the rubber after processing, such as mixing the rubber composition with a mixing roll, or extruding the rubber composition with an extruder, is scale-like. When the surface appearance of the rubber after processing is scale-like, there are problems that the vulcanization degree of the rubber is not sufficiently obtained at the subsequent step, particularly press-molding step, and the durability of the molded article of the rubber is degraded by remaining air or mold release agent in the molded article. Since the problems occur because the compatibility of the rubber with the filler is poor, they are solved by improving the compatibility. In the present invention, the compatibility of the rubber with the filler is improved by using the processing aid in the rubber composition to coat the processing aid having good compatibility with the rubber on the surface of the filler particles, and the processability is good.

In the present invention, it is required for the processing aid to be fatty acid ester, fatty acid salt or the mixture thereof. Examples of the fatty acid ester and fatty acid salt include fatty acids having 6 to 30 carbon atoms, such as lauric acid, myristic acid, palmistic acid, stearic acid, arachidic acid, oleic acid, linleic acid, linolenic acid and arachidonic acid, esters thereof and metal salts thereof, such as zinc salt, calcium salt and magnesium salt thereof. The processing aid may contain inorganic fillers, such as silica, clay, barium sulfate, calcium carbonate, magnesium carbonate and the like. Concrete examples of the processing aid used in the present invention include processing aids commercially available from Kawaguchi Chemical Industry Co., Ltd. under the trade name of "Exton" (such as "Exton L-2", "Exton L-7", "Exton H-11", "Exton H-12"); processing aids commercially available from Sanshin Chemical Ind. Co., Ltd. under the trade name of "Sanaid" (such as "Sanaid HP"); processing aids commercially available from Bayer AG under the trade name of "Aktiplast" (such as "Aktiplast T", "Aktiplast PP", "Aktiplast F", "Aktiplast M", "Aktiplast GT", "Aktiplast ST") and "Aflux" (such as "Aflux 42"); and the like.

It is desired for the amount of the processing agent to be within the range of 0.1 to 10 parts by weight, preferably 0.5 to 5 parts by weight, more preferably 1.0 to 4.5 parts by weight, based on 100 parts by weight of the base rubber. When the amount of the processing aid is smaller than 0.1 parts by weight, the processability is not sufficiently improved. On the other hand, when the amount of the processing aid is larger than 10 parts-by weight, the rebound characteristics are degraded.

The rubber composition for the solid golf ball of the present invention can contain other components, which have been conventionally used for preparing the core of solid golf balls, such as antioxidant, softening agent, organic sulfide compound. If used, the amount of the antioxidant is preferably 0.2 to 1.5 parts by weight, based on 100 parts by weight of the base rubber.

The core used for the golf ball of the present invention is obtained by uniformly mixing the above rubber composition, and then vulcanizing and press-molding under applied heat the mixture in a mold. The vulcanization may be conducted by press molding at 100 to 130° C. and 2.9 to 9.8 MPa for 15 to 60 minutes. The vulcanization is conducted at high temperature (150 to 170° C.) in the conventional method for preparing the core. On the other hand, in the present invention, it is possible to obtain the vulcanized molded article having the same vulcanization degree at the same condition as the conventional condition except that the vulcanization is conducted at the low temperature by using the above rubber composition.

The golf ball of the present invention may be a one-piece solid golf ball obtained by integrally press-molding the rubber composition under applied heat, a two-piece solid golf ball, which consists of a core of the rubber composition and a cover covering on the core, or a multi-piece solid golf ball, such as a three-piece solid golf ball comprising at least one rubber layer.

In the golf ball of the present invention, it is suitable for the core to have a diameter of 36.0 to 41.8 mm, preferably 37.0 to 41.0 mm, more preferably 38.0 to 40.5 mm. When the diameter of the core is smaller than 36.0 mm, it is required to increase the thickness of the cover, and the technical effects of improving the rebound characteristics accomplished by the presence of the core are not sufficiently obtained. On the other hand, when the diameter of the core is larger than 41.8 mm, the cover is too thin, and the durability of the resulting golf ball is poor. In addition, the shot feel is poor.

In the golf ball of the present invention, it is desired for the core to have a deformation amount when applying from an initial load of 98 N to a final load of 1275 N of 2.5 to 4.2 mm, preferably 2.7 to 3.6 mm, more preferably 2.8 to 3.2 mm. When the deformation amount of the core is smaller than 2.5 mm, the core is too hard, and the durability or shot feel of the resulting golf ball is poor. On the other hand, when the deformation amount is larger than 4.2 mm, the core is too soft, and the shot feel of the resulting golf ball is poor.

In the golf ball of the present invention, it is desired for the core to have a center hardness in JIS-C hardness of 50 to 70, preferably 53 to 69, more preferably 55 to 68. When the center hardness is lower than 50, the core is too hard, and the shot feel is poor. On the other hand, when the center hardness is higher than 70, the core is too soft, and the shot feel is poor.

In the golf ball of the present invention, it is desired for the core to have a hardness at a distance of 5 mm from the center point of the core in JIS-C hardness of 59 to 79, preferably 62 to 78, more preferably 64 to 77. When the center hardness is lower than 59, the core is too hard, and the shot feel is poor. On the other hand, when the center hardness is higher than 79, the core is too soft, and the shot feel is poor. In addition, it is desired for the core to have a hardness at a distance of 10 mm from the center point of the core in JIS-C hardness of 64 to 84, preferably 67 to 83, more preferably 69 to 82. It is desired for the core to have a hardness at a distance of 15 mm from the center point of the core in JIS-C hardness of 66 to 86, preferably 69 to 85, more preferably 71 to 84.

In the golf ball of the present invention, it is desired for the core to have a surface hardness in JIS-C hardness of 70 to 90, preferably 73 to 89, more preferably 75 to 88. When the center hardness is lower than 70, the core is too hard, and the shot feel is poor. On the other hand, when the center hardness is higher than 90, the core is too soft, and the shot feel is poor. The term "surface hardness" as used herein refers to the hardness, which is determined by measuring a JIS-C hardness at the surface of the resulting core formed by vulcanizing and press-molding as described above. The term "center hardness of the core", "hardness at a distance of 5 mm from the center point of the core", "hardness at a distance of 10 mm from the center point of the core" and "hardness at a distance of 15 mm from the center point of the core" as used herein refer to the hardness, which is determined by cutting the resulting core into two equal parts and then measuring a JIS-C hardness at its center point, and at a distance of 5 mm, 10 mm and 15 mm from the center point in section.

In the golf ball of the present invention, it is desired for the core to have a hardness difference (B-A) between the surface hardness (B) and the center hardness (A) of 15 to 28, preferably 17 to 25, more preferably 18 to 22. When the hardness difference is smaller than 15, the core has nearly even hardness distribution, and the shot feel is poor. On the other hand, when the hardness difference is larger than 28, the shot feel is poor. If the golf ball of the present invention is one-piece golf ball, the golf ball itself, which is not the core, has the above performances, such as the hardness.

The cover is then covered on the core. In the golf ball of the present invention, the cover may be formed from thermoplastic resin, particularly ionomer resin, which has been conventionally used for the cover of solid golf balls, or the mixture of thereof. The ionomer resin may be a copolymer of α-olefin and α, β-unsaturated carboxylic acid having 3 to 8 carbon atoms, of which a portion of carboxylic acid groups is neutralized with metal ion, a terpolymer of α-olefin, α, β-unsaturated carboxylic acid having 3 to 8 carbon atoms and α, β-unsaturated carboxylic acid ester, of which a portion of carboxylic acid groups is neutralized with metal ion, or mixtures thereof. Examples of the α-olefins in the ionomer preferably include ethylene, propylene and the like. Examples of the α, β-unsaturated carboxylic acid in the ionomer include acrylic acid, methacrylic acid, fumaric acid, maleic acid, crotonic acid and the like, preferred are acrylic acid and methacrylic acid. Examples of the α, β-unsaturated carboxylic acid ester in the ionomer include methyl ester, ethyl ester, propyl ester, n-butyl ester and isobutyl ester of acrylic acid, methacrylic acid, fumaric acid, maleic acid, crotonic acid and the like. Preferred are acrylic acid esters and methacrylic acid esters. The metal ion which neutralizes a portion of carboxylic acid groups of the copolymer includes alkali metal ion, such as sodium ion, potassium ion, lithium ion and the like; divalent metal ion, such as zinc ion, calcium ion, magnesium ion, and the like; trivalent metal ion, such as an aluminum ion, a neodymium ion and the like; and the mixture thereof. Preferred are sodium ions, zinc ions, lithium ions and the like, in view of rebound characteristics, durability and the like.

The ionomer resin is not limited, but examples thereof will be shown by a trade name thereof. Examples of the ionomer resins, which are commercially available from Du Pont-Mitsui Polychemicals Co., Ltd. include Hi-milan 1555, Hi-milan 1557, Hi-milan 1601, Hi-milan 1605, Hi-milan 1652, Hi-milan 1702, Hi-milan 1705, Hi-milan 1706, Hi-milan 1707, Hi-milan 1855, Hi-milan 1856, Hi-milan AM7316 and the like. Examples of the ionomer resins, which are commercially available from Du Pont Co., include Surlyn 8945, Surlyn 9945, Surlyn 6320, Surlyn 8320, Surlyn AD8511, Surlyn AD8512, Surlyn AD8542 and the like. Examples of the ionomer resins, which are commercially available from Exxon Chemical Co., include Iotek 7010, Iotek 8000 and the like. These ionomer resins may be used alone or in combination.

As the materials suitably used in the cover of the present invention, the above ionomer resin may be used alone, but the ionomer resin may be used in combination with at least one of thermoplastic elastomer, diene block copolymer and the like. Examples of the thermoplastic elastomers include polyamide-based thermoplastic elastomer, which is commercially available from Atofina Japan Co., Ltd. under the trade name of "Pebax" (such as "Pebax 2533"); polyester-based thermoplastic elastomer, which is commercially available from Toray-Du Pont Co., Ltd. under the trade name of "Hytrel" (such as "Hytrel 3548", "Hytrel 4047"); polyurethane-based thermoplastic elastomer, which is commercially available from BASF Japan Co., Ltd. under the trade name of "Elastollan" (such as "Elastollan ET880"); and the like.

The diene-based block copolymer is a block copolymer or partially hydrogenated block copolymer having double bond derived from conjugated diene compound. The base bock copolymer is block copolymer composed of block polymer block A mainly comprising at least one aromatic vinyl compound and polymer block B mainly comprising at least one conjugated diene compound. The partially hydrogenated block copolymer is obtained by hydrogenating the block copolymer. Examples of the aromatic vinyl compounds comprising the block copolymer include styrene, α-methyl styrene, vinyl toluene, p-t-butyl styrene, 1,1-diphenyl styrene and the like, or mixtures thereof. Preferred is styrene. Examples of the conjugated diene compounds include butadiene, isoprene, 1,3-pentadiene, 2,3-dimethyl-1,3-butadiene and the like, or mixtures thereof. Preferred are butadiene, isoprene and combinations thereof. Examples of the diene block copolymers include an SBS (styrene-butadiene-styrene) block copolymer having polybutadiene block with epoxy groups or SIS (styrene-isoprene-styrene) block copolymer having polyisoprene block with epoxy groups and the like. Examples of the diene block copolymers which is commercially available include the diene block copolymers, which are commercially available from Daicel Chemical Industries, Ltd. under the trade name of "Epofriend" (such as "Epofriend A1010"), the diene-based block copolymers, which are commercially available from Kuraray Co., Ltd. under the trade name of "Septon" (such as "Septon HG-252" and the like) and the like.

The amount of the thermoplastic elastomer or diene-based block copolymer is 1 to 60 parts by weight, preferably 1 to 35 parts by weight, based on 100 parts by weight of the base resin for the cover. When the amount is smaller than 1 part by weight, the technical effects of improving shot feel accomplished by the presence of the thermoplastic elastomer or diene-based block copolymer are not sufficiently obtained. On the other hand, when the amount is larger than 60 parts by weight, the cover is too soft, and the rebound characteristics are degraded, or the compatibility with the ionomer resin is degraded, and the durability is degraded.

The composition for the cover used in the present invention may optionally contain pigments (such as titanium dioxide, etc.), fillers (such as barium sulfate, etc.) and the other additives such as a dispersant, an antioxidant, a UV absorber, a photostabilizer and a fluorescent agent or a fluorescent brightener, etc., in addition to the above resin component as a main component, as long as the addition of the additives does not deteriorate the desired performance of the golf ball cover. The amount of the pigment is preferably from 0.01 to 10.0 parts by weight, based on 100 parts by weight of the cover resin component.

A method of covering on the core with the cover is not specifically limited, but may be a conventional method for forming golf ball cover well known in the art. For example, there can be used a method comprising molding the cover composition into a semi-spherical half-shell in advance, covering the core with the two half-shells, followed by pressure molding at 130 to 170° C. for 1 to 15 minutes, or a method comprising injection molding the cover composition directly on the core.

In the golf ball of the present invention, it is desired for the cover-to have a thickness of 0.4 to 2.4 mm, preferably 0.6 to 1.6 mm, more preferably 0.8 to 1.4 mm. When the thickness is smaller than 0.4 mm, the durability and shot feel of the resulting golf ball are degraded. On the other hand, when the thickness is larger than 2.4 mm, the cover is too thick, and the rebound characteristics of the core are not sufficiently obtained.

In the golf ball of the present invention, it is desired for the cover to have a hardness in JIS-C hardness of 50 to 98, preferably 60 to 93, more preferably 70 to 90. When the hardness of the cover is lower than 50, the cover is easily chipped off by a golf club, and the durability of the resulting golf ball is poor. In addition, the shot feel is poor such that the golfer feels to directly hit the core. On the other hand, when the hardness of the cover is higher than 98, the shot feel of the resulting golf ball is poor. In addition, the cover is easily cut, which degrades the durability.

In the golf ball of the present invention, the cover may have single-layered structure or have multi-layered structure, which has two or more layers. If the cover has multi-layered structure, it is desired that the total cover thickness and the hardness of the outmost layer of the cover be within the above ranges.

At the time of molding the cover, many depressions called "dimples" are formed on the surface of the golf ball. Furthermore, paint finishing or marking with a stamp may be optionally provided after the cover is molded for commercial purposes. The golf ball of the present invention is formed, so that it has a diameter of not less than 42.67 mm (preferably 42.67 to 42.80 mm) and a weight of not more than 45.93 g, in accordance with the regulations for golf balls.

EXAMPLES

The following Examples and Comparative Examples further illustrate the present invention in detail but are not to be construed to limit the scope of the present invention.

Production of Cores

The rubber compositions for cores having formulations shown in Table 1 were mixed with a mixing roll, and then vulcanized by press-molding at the condition shown in the same Table to obtain spherical cores having a diameter of 38.5 mm. The processability of the rubber composition was evaluated, and the hardness distribution and deformation amount of the resulting core were measured, and the results are shown in Table 3. The test methods are described later.

TABLE 1

|  |  | Example No. | (Parts by weight) Comparative Example No. | | | |
| --- | --- | --- | --- | --- | --- | --- |
| Core composition |  | 1 | 1 | 2 | 3 | 4 |
| CB22 *1 |  | 100 | — | 100 | 100 | 100 |
| BR01 *2 |  | — | 100 | — | — | — |
| Zinc acrylate |  | 33.0 | 33.0 | 33.0 | 33.0 | 33.0 |
| Zinc oxide |  | 18.3 | 17.5 | 17.5 | 17.5 | 18.3 |
| Aktiplast ST *3 |  | 4.0 | — | — | — | 4.0 |
| Dicumyl peroxide |  | — | 1.0 | 1.0 | — | 1.0 |
| 1,1-bis (t-butyl peroxy)-3,3,5-trimethyl cyclohexane |  | 1.0 | — | — | 1.0 | — |
| Vulcanization condition | Temp. (° C.) | 130 | 170 | 170 | 130 | 170 |
|  | Time (min) | 15 | 15 | 15 | 15 | 15 |

*1: Buna CB22 (trade name), polybutadiene rubber synthesized using lanthanide-containing catalyst commercially available from Bayer AG; content of cis-1,4 bond: 98%, Mooney viscosity: 63 $ML_{1+4}$ (100° C.) and Mw/Mn = 2.5
*2: BR01 (trade name), polybutadiene rubber synthesized using nickel-containing catalyst commercially available from JSR Co., Ltd.; content of cis-1,4 bond: 98%, Mooney viscosity: 44 $ML_{1+4}$ (100° C.) and Mw/Mn = 3.5
*3: Aktiplast ST (trade name), processing aid commercially available from Bayer AG, mixture of fatty acid zinc salt, fatty acid ester, organic and inorganic fillers Preparation of Cover Compositions The formulation materials for the cover shown in Table 2 were mixed using a kneading type twin-screw extruder to obtain pelletized cover compositions. The extrusion condition was,
  a screw diameter of 45 mm,
  a screw speed of 200 rpm, and
  a screw L/D of 35.

The formulation materials were heated at 200 to 260° C. at the die position of the extruder.

TABLE 2

| Cover composition | Amount (parts by weight) |
| --- | --- |
| Hi-milan 1605 *4 | 100 |
| Titanium oxide | 3 |

*4: Hi-milan 1605 (trade name), ethylene-methacrylic acid copolymer ionomer resin obtained by neutralizing with sodium ion, manufactured by Du Pont-Mitsui Polychemicals Co., Ltd.

Example 1 and Comparative Examples 1 to 4

The cover compositions were covered on the resulting core by injection molding to obtain solid golf balls having a diameter of 42.7 mm. The coefficient of restitution, durability and shot feel of the resulting golf balls were measured or evaluated, and the results are shown in Table 3. The test methods are as follows.

Test Methods (1) Processability

The rubber composition was extruded into a cylinder using a single screw extruder. The extrusion condition was,
  a screw diameter of 30 mm,
  a barrel temperature of 40° C.
  a extruding rate of 2 m/minutes, and
  a die diameter of 20 mm.

The processability was determined by evaluating the surface appearance of the cylinder by visual observation. The evaluation criteria are as follows.

(Evaluation Criteria)

o: The processability is good such that the surface appearance of the cylinder is smooth and even.

Δ: The processability is slightly poor such that the surface appearance of the cylinder is uneven.

x: The processability is poor such that the surface appearance of the cylinder is fragmentary and there are scale-like projections on the surface thereof.

(2) Hardness of Core

The surface hardness of the core was determined by measuring a JIS-C hardness at the surface of the resulting core. The center hardness, hardness at a distance of 5 mm from the center point, hardness at a distance of 10 mm from the center point and hardness at a distance of 15 mm from the center point of the core were determined by cutting the resulting core into two equal parts and then measuring a JIS-C hardness at its center point, and at positions of 5 mm, 10 mm and 15 mm from the center point in section. The JIS-C hardness was measured using a JIS-C hardness meter according to JIS K6301.

(3) Deformation Amount of the Core

The deformation amount was determined by measuring the deformation amount when applying from an initial load of 98 N to a final load of 1275 N on the core.

(4) Coefficient of Restitution

A stainless steel cylinder having a weight of 198.4 g was struck at a speed of 45 cm/sec against a golf ball using a compressed-air actuated resilience gun, and the velocity of the cylinder and the golf ball before and after the strike were measured. The larger the coefficient of restitution is, the more excellent the rebound characteristics are.

(5) Durability

After a No. 1 wood club (a driver, W#1) having metal head was mounted to a swing robot manufactured by True Temper Co., a golf ball was hit at a head speed of 45 m/second to strike against an impact board, repeatedly. The durability is the number of strike until the cover of the golf ball cracks, and is indicated by an index when that of Comparative example 1 is 100. When the number is more than 100, the golf ball has better durability than the golf ball of Comparative Example 1. The larger the number is, the better durability the golf ball has.

(6) Shot Feel

The shot feel of the golf ball is evaluated by 10 golfers according to a practical hitting test using a No. 1 wood club (W#1, a driver) having metal head. The evaluation criteria are as follows. The results shown in the Tables below are based on the fact that the most golfers evaluated with the same criterion about shot feel.

(Evaluation Criteria)

o: The golfers felt that the golf ball has good shot feel such that the impact force at the time of hitting is small Δ: The golfers felt that the golf ball has fairly good shot feel.

x: The golfers felt that the golf ball has poor shot feel such that the impact force at the time of hitting is large.

(Test Results)

TABLE 3

| Test item | Example No. 1 | Comparative Example No. 1 | 2 | 3 | 4 |
|---|---|---|---|---|---|
| Processability (Core) | ○ | ○ | X | X | ○ |
| Hardness (JIS-C) | | | | | |
| Center (A) | 66 | 65 | 72 | 66 | 73 |
| 5 mm from the center | 75 | 74 | 75 | 74 | 75 |
| 10 mm from the center | 78 | 77 | 76 | 78 | 77 |
| 15 mm from the center | 82 | 82 | 78 | 83 | 79 |
| Surface (B) | 86 | 85 | 84 | 85 | 85 |
| Difference (B-A) | 20 | 20 | 12 | 19 | 12 |
| Deformation amount (mm) (Golf ball) | 2.96 | 2.94 | 2.98 | 3.02 | 3.03 |
| Coefficient of restitution | 0.772 | 0.760 | 0.778 | 0.775 | 0.771 |
| Durability | 105 | 100 | 84 | 88 | 98 |
| Shot feel | ○ | ○ | X | ○ | X |

As is apparent from the results shown in Table 3, the two-piece solid golf ball of Example 1 of the present invention has good processability, excellent rebound characteristics and excellent durability, compared with the two-piece solid golf balls of Comparative Examples 1 to 4.

On the other hand, in the golf ball of Comparative Example 1, since the polybutadiene synthesized using nickel-containing catalyst is only used as a base rubber of the rubber composition for the core, the core has the hardness distribution such that the outer portion is hard and the inner portion is soft, and the processability and shot feel are good, but the coefficient of restitution is small. In the golf ball of Comparative Example 2, since the polybutadiene synthesized using lanthanide-containing catalyst is only used as a base rubber of the rubber composition for the core, the coefficient of restitution is large. However, since the dicumyl peroxide having 10 hours half-life period temperature of 117° C. is used as an organic peroxide of the rubber composition for the core, the hardness distribution of the core such that the outer portion is hard and the inner portion is soft is not sufficiently obtained and the shot feel the resulting golf ball is poor.

In the golf ball of Comparative Example 3, since the polybutadiene synthesized using lanthanide-containing catalyst is only used as a base rubber of the rubber composition for the core and 1,1-bis (t-butylperoxy)-3,3,5-trimethylcyclohexane having 10 hours half-life period temperature of 90° C. is used as an organic peroxide of the rubber composition for the core. Therefore, the core has the hardness distribution such that the outer portion is hard and the inner portion is soft at low temperature vulcanization condition, the coefficient of restitution is large and the shot feel is good, but the processability and durability are poor. In the golf ball of Comparative Example 4, since the polybutadiene synthesized using lanthanide-containing catalyst and processing aid are used in the rubber composition for the core, the coefficient of restitution is large and the processability and durability are good. However, since the dicumyl peroxide having 10 hours half-life period temperature of 117° C. is used as an organic peroxide of the rubber composition for the core, the hardness distribution of the core such that the outer portion is hard and the inner portion is soft is not sufficiently obtained, and the shot feel of the resulting golf ball is poor.

What is claimed is:

1. A golf ball comprising a core formed by vulcanizing and press-molding a rubber composition and at least one layer of a cover covering the core, wherein
    the rubber composition comprises a base rubber, a co-crosslinking agent, an organic peroxide, a filler and a processing aid,
    the base rubber comprises a polybutadiene (a) containing a cis-1,4 bond of not less than 80% and synthesized using lanthanide-containing catalyst,
    the organic peroxide comprises an organic peroxide having 10 hours half-life period temperature of 80 to 100° C.,
    the processing aid is fatty acid ester, fatty acid salt or a mixture thereof, and
    the polybutadiene (a) has a ratio (Mw/Mn) of weight average molecular weight (Mw) to number average molecular weight (Mn) of 2.5 to 3.5, and
    the core has a center hardness in JIS-C hardness of 50 to 70, a surface hardness in JIS-C hardness of 70 to 90 and a hardness difference (B-A) between the surface hardness (B) and the center hardness (A) of 15 to 28.

2. The golf ball according to claim 1, wherein the polybutadiene (a) has a Mooney viscosity of not less than 50 to less than 65 $ML_{1+4}$ (100° C.).

3. The golf ball according to claim 1, wherein the organic peroxide is 1,1-bis (t-butylperoxy)-3,3,5-trimethylcyclohexane.

4. The golf ball according to claim 1, wherein the processing aid is contained in an amount of 0.1 to 10 parts by weight, based on 100 parts by weight of the base rubber.

5. The golf ball according to claim 1, wherein the vulcanization of the rubber composition is conducted by press molding at 100 to 130° C.

* * * * *